United States Patent [19]
Gail et al.

[11] Patent Number: 5,752,805
[45] Date of Patent: May 19, 1998

[54] BRUSH SEAL FOR TURBO-ENGINES

[75] Inventors: Alfons Gail, Friedberg; Uwe Michel, Bergkirchen; Edgar Pfister, Dachau; Lothar Reisinger, Niederroth; Thomas Miller, Emmering, all of Germany

[73] Assignee: MTU Motoren- und Turbinen-Union, Munich, Germany

[21] Appl. No.: 680,854

[22] Filed: Jul. 16, 1996

[30] Foreign Application Priority Data

Jul. 28, 1995 [DE] Germany .................. 195 27 605.1
Jul. 28, 1995 [DE] Germany .................. 195 27 781.3

[51] Int. Cl.$^6$ ............................................ F04D 29/44
[52] U.S. Cl. ........................ 415/229; 415/230; 277/53
[58] Field of Search ..................... 415/170.1, 174.5, 415/229, 230; 277/53, 23, 18

[56] References Cited

U.S. PATENT DOCUMENTS

| | | | |
|---|---|---|---|
| 5,106,104 | 4/1992 | Atkinson et al. | |
| 5,201,530 | 4/1993 | Kelch et al. | 415/170.2 |
| 5,308,088 | 5/1994 | Atkinson et al. | 277/53 |
| 5,318,309 | 6/1994 | Tseng et al. | 415/173.5 |
| 5,474,305 | 12/1995 | Flower | 277/53 |
| 5,474,306 | 12/1995 | Bagepalli et al. | 415/174.2 |
| 5,496,045 | 3/1996 | Millener et al. | 415/174.5 |
| 5,568,931 | 10/1996 | Tseng et al. | 277/53 |
| 5,628,622 | 5/1997 | Thore et al. | 415/175.1 |

FOREIGN PATENT DOCUMENTS

| | | |
|---|---|---|
| 24 55 195 | 5/1975 | Germany . |
| 3425162C2 | 1/1986 | Germany . |
| 3606283A1 | 2/1987 | Germany . |
| 3907614A1 | 9/1990 | Germany . |

*Primary Examiner*—John T. Kwon
*Attorney, Agent, or Firm*—Evenson McKeown Edwards & Lenahan, PLLC

[57] ABSTRACT

A brush seal assembly for turbo-engines is provided for sealing off spaces on a circumferential gap which are differently acted upon by pressure, particularly between an engine stator and an engine rotor. A holding device for a bristle bundle is provided on the engine stator, from which holding device the bristle bundle is guided between circumferential webs in a sealing manner against the engine rotor and forms an axial gap in the circumferential direction with respect to one web facing the high-pressure side. In this case, at least on the side which faces the space of the higher pressure on the seal, the bristle bundle is to have devices for the shielding against a turbulent flow triggered by the engine rotor.

25 Claims, 6 Drawing Sheets

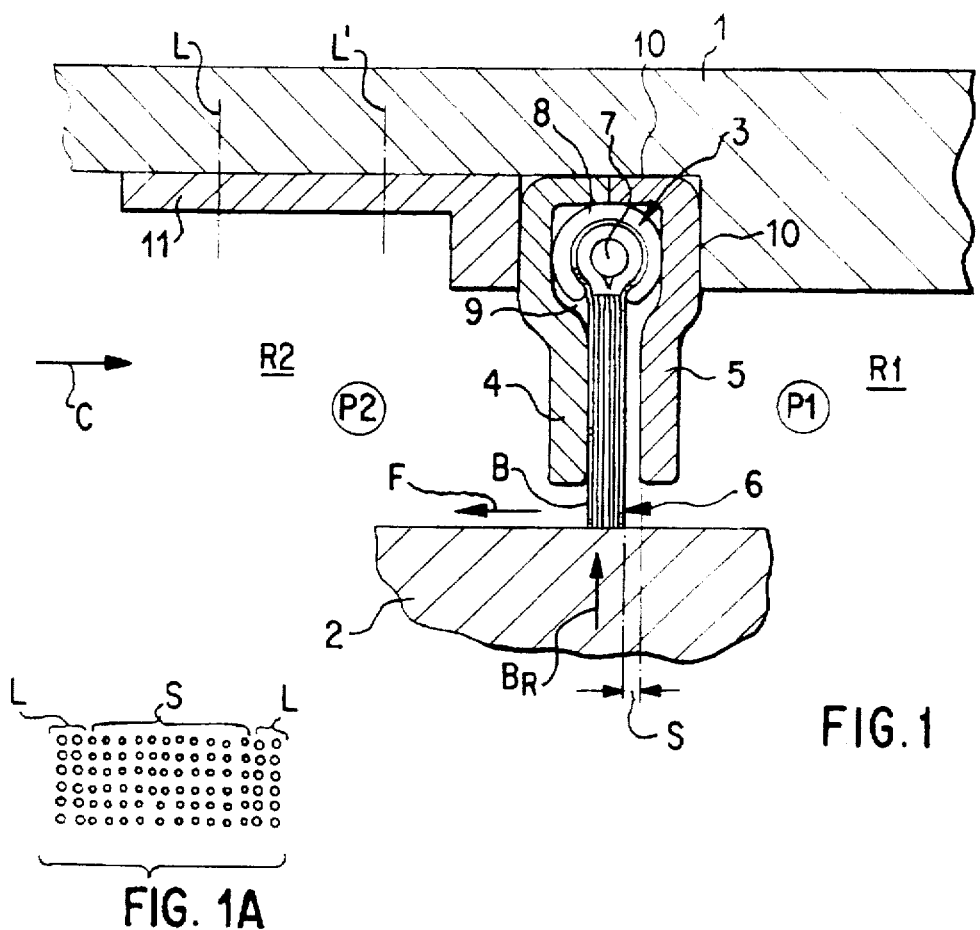
FIG. 1
FIG. 1A
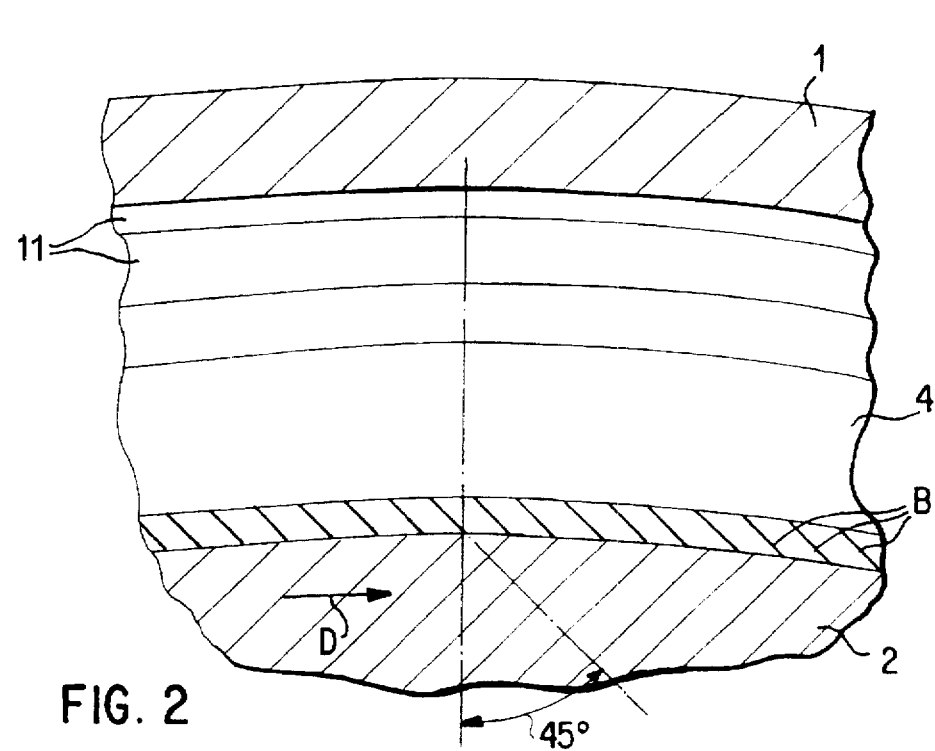
FIG. 2

BRUSH SEAL FOR TURBO-ENGINES

BACKGROUND AND SUMMARY OF THE INVENTION

This invention relates to a brush seal for turbo-engines of the type having an engine rotor and stator with a bristle bundle held in sliding sealing contact with the rotor intermediate an upstream high pressure space and a downstream low pressure space.

Brush seals of the above-mentioned type (German Patent Document DE 39 07 614 A1) are used in turbo-engines, particularly gas turbine engines, in order to seal off spaces with respect to one another with as little leakage flux as possible on circumferential gaps which are acted upon fluidically by pressure in different manners, for example, between an engine casing and the rotor or an engine shaft. It must be possible in this case to compensate eccentric rotor or shaft positions relative to the casing resulting, for example, from unbalanced rotor masses by means of an elastic and movable following of bristles.

It is a significant disadvantage of the above-mentioned as well as of other known brush seals that, as a result of the shaft rotation, the bristles of the brush are subjected to a rotating turbulent flow which has a negative effect on the shape and the intended geometrical arrangement of the brush and therefore on the sealing effect. The turbulent flow has a particularly negative effect on the local position of those free ends of the bristles which project with respect to the ends of guide webs in the direction of the rotor surface or shaft surface. A reliable, low-leakage primary sealing is therefore not ensured. The above-mentioned turbulent flow and its disadvantageous consequences can also not be excluded on the low-pressure side of the seal. In addition, the formation of individual and particularly pronounced types and geometries of turbulences may still be increased by special shaft-side surface geometries and attachments (screws, beads, steps).

It is an object of the invention to provide a brush seal of the initially mentioned type which, in view of a rotating turbulent flow or turbulence formation caused by the shaft ensures the maintaining of the shape and geometry of the bristles for the purpose of an optimal sealing.

According to the invention, this object is achieved by providing a brush assembly of the type having an engine rotor and an engine stator, comprising a bristle bundle, a bundle holder holding the bundle in sliding sealing contact with one of the engine rotor and engine stator intermediate an upstream high pressure space and a downstream low pressure space, and a turbulence reducer disposed upstream of at least some of the bristle bundle bristles.

By means of the invention, a rotating turbulent current which is generated by the rotating rotor in the space of the higher pressure in front of the device of the seal can largely be dissolved and can essentially be dissipated with respect to its original energy content. Thus, a significant portion of the turbulent flow of the fluid which is now already relatively calm flows-off into the axial ring duct in front of the seal (bristle bundle) in which the flow rate of the fluid, such as air, is increased, with a simultaneously occurring pressure reduction in the axial ring duct relative to the higher pressure level which exists in the space or the annulus in front of the device. The axial ring duct represents an additional "calming path" for the fluid flowing out of the space of the higher pressure against the bristle bundle. A remaining portion of the rotating turbulent flow, for the purpose of the above-mentioned turbulence calming or resolving, flows off laterally into the device and flows essentially in the radial direction along the radially interior circumferential surface of the device into the axial ring gap.

According to certain preferred embodiments of the invention, the turbulence reducer is advantageously a shielding device which is a component of the bristle bundle or package. The shielding device effectively protects and stabilizes the bristle bundle with respect to a rotating turbulent flow. In this case, the bristles of a bristle bundle are guided along the respective larger portion of their longitudinal course between the axially spaced webs and are shielded with respect to the local pressure spaces. The axial gap, whose gap flank may in each case be formed by a shielding device, may be constructed of a smaller gap width and may be dimensioned to be essentially approximately 1/10 of the maximal width of the bristle bundle. This axial gap prevents a local forcing of the bristles between the two webs and ensures a required minimum play of the bristles in the circumferential and axial direction. In addition, by way of this axial gap, a circumferentially uniform fluid pressure distribution can be achieved on the respective shielding device and other bristle components of the bundle adjoining on the inside.

According to a variant of the invention, the shielding device may be formed of at least one layer or row of bristles of a relatively large bristle or thread thickness on the bristle bundle. The largest bristle thickness should be dimensioned such that, among other things, these thick bristles also ensure the required deformation elasticity for the purpose of an optimal sealing.

An increased overall stability with respect to a turbulent flow which may possibly also occur on the low-pressure side is obtained by providing at least one layer or row of bristles of a relatively large bristle or thread thicker on both the upstream and downstream sides.

The sealing effect and the overall stability of the bristle bundle can be increased if—in addition to the existing shielding devices—there is a construction of the bundle with a thread thickness or bristle thickness which changes in layers or rows.

Other preferred embodiments include a turbulence reducer in the form of a shielding device constructed as a wire netting. The wire netting can be formed of crosssoldered or mutually interwoven fine wires. By way of the meshes of the wire netting, for example, a rotating air swirl can be damped or largely neutralized. When this "shielding device" is arranged on the high-pressure and the low-pressure side, the bristles are axially held together in a manner of cage so that axial bristle deflections can also be limited, particularly on the brush end which projects laterally out of the webs. The wire netting has a ring-shaped construction and is held with play by means of a central bore with respect to the rotor or the shaft.

According to other preferred embodiments the turbulence reducer is separate from and spaced from the bristle bundle in an upstream high pressure space.

According to certain preferred embodiments the turbulence reducer is advantageously constructed as a porously ducted ring body.

In the case of preferred embodiments of the invention, the bristles of a bristle bundle are guided along the respective larger portion of their longitudinal course between axially spaced webs and are shielded with respect to the pressure spaces. The axial gap between the upstream web and the bristle bundle is constructed of a smaller gap width and may be dimensioned to be essentially approximately 1/10 of the maximal width of the bristle bundle. As mentioned above for the other embodiments where the turbulence reducer is part of or connected directly to the bristle bundle, this axial gap prevents a local forcing of the bristles between the two webs and ensures a required minimum play of the bristles in the circumferential and axial direction. In addition, by way of this axial gap, a circumferentially uniform fluid pressure distribution can be achieved on the upstream circumferential side of the bristle bundle.

According to preferred embodiments the turbulence reducer includes a metallic sponge whose porous structure is adapted to the dissipation of the turbulence as well as to the guiding of the fluid through the ring body in the direction of the axial ring duct. The sponge may be constructed of a metallic light construction material, such as a titanium aluminide of a globular cell structure. It may also be made in the manner of a hollow ball in several sintering steps from an intermetallic compound or its alloys. By means of the hollow-ball structure, the porosity or a corresponding duct arrangement can be taken into account during the manufacturing.

According to other preferred embodiments the turbulence reducer is represented by a ring body constructed in the manner of a honeycomb, in which case radial or axial or combined axial, radial ducts which are locally connected with one another fluidically are constructed along the honeycomb structure or integrated in it. According to certain embodiments, the axial ducts on the ends facing away from the high-pressure side lead into a circumferential gap which is connected with the axial ring duct.

Particularly while using another metal sponge for the turbulence reducer, an increased sealing effect is achieved within the scope of a multistep pressure seal according to certain preferred embodiments. Possibly still existing residual turbulences in the flow downstream of the first seal can in this manner be completely eliminated in front of the second seal.

Other objects, advantages and novel features of the present invention will become apparent from the following detailed description of the invention when considered in conjunction with the accompanying drawings.

BRIEF DESCRIPTION OF THE DRAWINGS

FIG. 1 is an axial sectional view of a brush seal assigned to sections of an engine stator and rotor shown by broken-off lines, and with a turbulence reducer along one high-pressure-side bristle flank of the axial gap S, formed of bristle layers of a relatively large thread thickness;

FIG. 1A is a schematic partial radial view in the direction of arrow $B_R$, depicting the different thickness bristles in the various bristle layers;

FIG. 2 is a view according to the viewing direction C of FIG. 1;

DETAILED DESCRIPTION OF THE DRAWINGS

Figure 3:
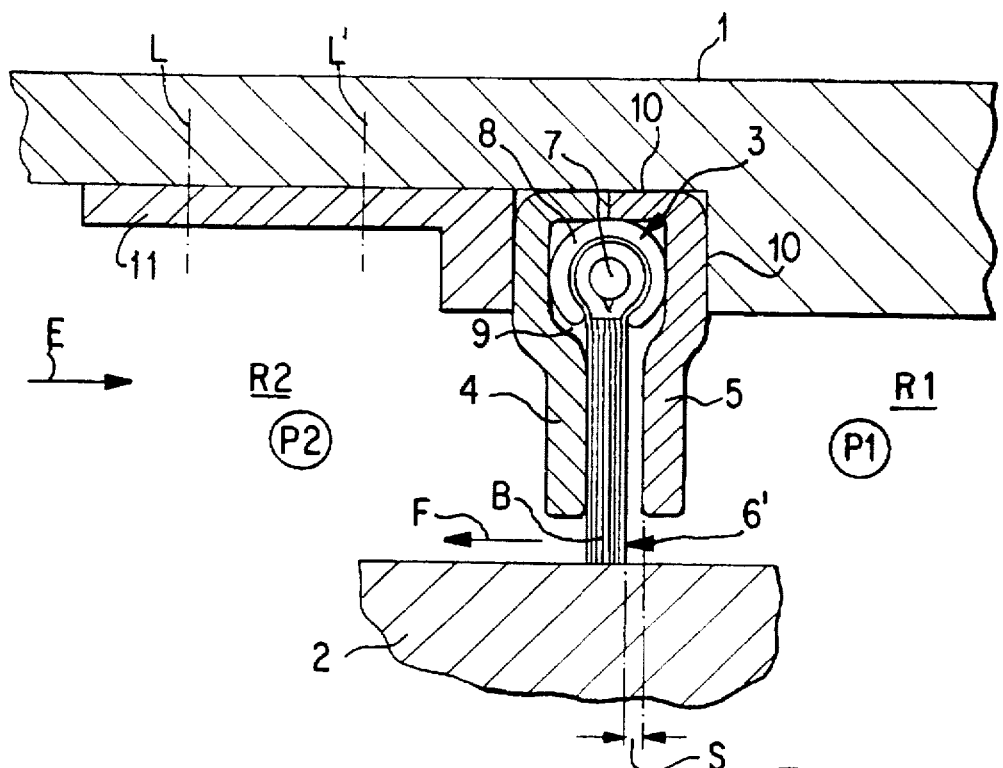
FIG. 3 is an alternative axial sectional view in the sense of FIG. 1, in which case, however, the turbulence reducer is formed along the high-pressure side bristle flank of the axial gap S by a wire netting on the bristle bundle.
Figure 4:
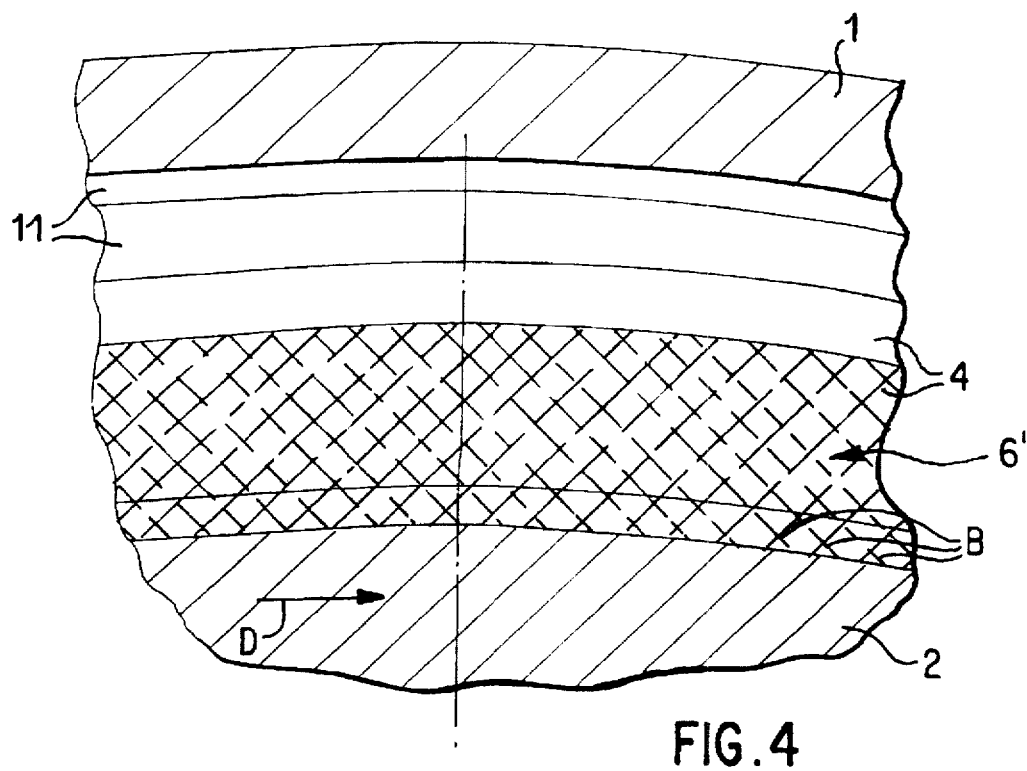
FIG. 4 is a view according to the viewing direction E of FIG. 3, in which the wire netting is illustrated by mutually crossing lines.

FIGS. 1 and 2 show a brush seal for a turbo-engine. The brush seal has the purpose of sealing off, between an engine casing 1 and the surface of an engine rotor 2 which is rotatably disposed in the casing in a coaxial manner, a circumferential gap with respect to spaces R1, R2 which are fluidically acted upon by pressure in different manners. In this case the fluid pressure P1 existing in space R1 is higher than the fluid pressure P2 in space R2. The primary leakage flux at the seal is indicated by the arrow F. A holding device 3 for a bristle bundle B is provided on the engine stator 1. From the holding device 3, the bristle bundle B is guided between essentially parallel webs 4, 5 standing perpendicular relative to the rotor surface, in a sealing manner against the rotor surface. On the side facing the space R2 with the lower pressure P2, the bristle bundle B touches the corresponding one interior surface of the web 4. On the other side facing the space R1 with the higher pressure P1, the bristle bundle B forms an axial gap S in the circumferential direction with respect to the interior surface of the web 5. According to FIGS. 1 and 2, the shielding devices 6 form the one flank of the axial gap S on the bristle bundle B. The shielding device 6 consists of at least two bristles which follow one another axially in a row or a layer and have a relatively large bristle diameter in comparison to the other bristles on the bristle bundle B which are constructed with relatively small diameters. FIG. 1A schematically depicts the different thickness layers with relatively large thickness layers L at both the upstream and downstream sides, and the smaller bristle thickness bristles S therebetween.

FIG. 2 only schematically shows the bristles of the of bundle B, which are drawn here with relatively large circumferential distances and, along the circumference in the rotating direction D of the engine rotor 2, are, in each case, uniformly set diagonally at an angle of 45° and are tangent on the rotor surface.

The above-mentioned shielding device 6 is arranged on the holding device 3 together with the bristle bundle B. In this case, the shielding device is held between a section of the bristle bundle B bent essentially in a U-shape around a core ring 7 and a clamping tube 8. The latter has a circumferential slot for the bristle bundle B. The clamping tube 8 is fixed radially on the inside in an annulus 9 which is open one side and is formed by two casing parts containing the circumferential webs 4, 5. Both housing parts with the webs 4, 5 are clamped into a circumferential groove and held. This groove is formed by a stepped widening 10 of the engine casing 1 on a larger inside diameter as well as by the axial end surface of a ring component 11. The latter is screwed along the lines L, L' to the engine casing 1.

All bristles of the bristle bundle B may be made of a ceramic material, particularly silicon carbide. As an alternative, highly alloyed metallic bristle materials may be used. The mentioned information concerning the material may be used within the scope of the invention accordingly in all embodiments.

Using the same reference number for a construction which is basically identical to FIGS. 1 and 2, FIGS. 3 and 4 show a modified embodiment in which the one flank of the axial gap S formed by the bristle bundle B on the high-pressure side is represented by a shielding device 6' constructed as a wire netting. The fastening by way of the holding device 13 is practically identical with that of FIG. 1. According to the viewing direction E from FIG. 3, the wire netting in FIG. 4 as the shielding device 6' is illustrated by the crossed position of the wires and showing through the bristle bundle B and the web 4.

The invention may also be constructed as a stepped pressure seal with at least two brush seals which axially follow one another at a distance relative to the shaft and have the respective bristle bundles B according to FIG. 1 and 2 or FIG. 2 and 3.

FIGS. 5–12 relate to embodiments of brush seal assemblies where the turbulence reducer is formed separately and spaced from the bristle bundle.

Figure 5:
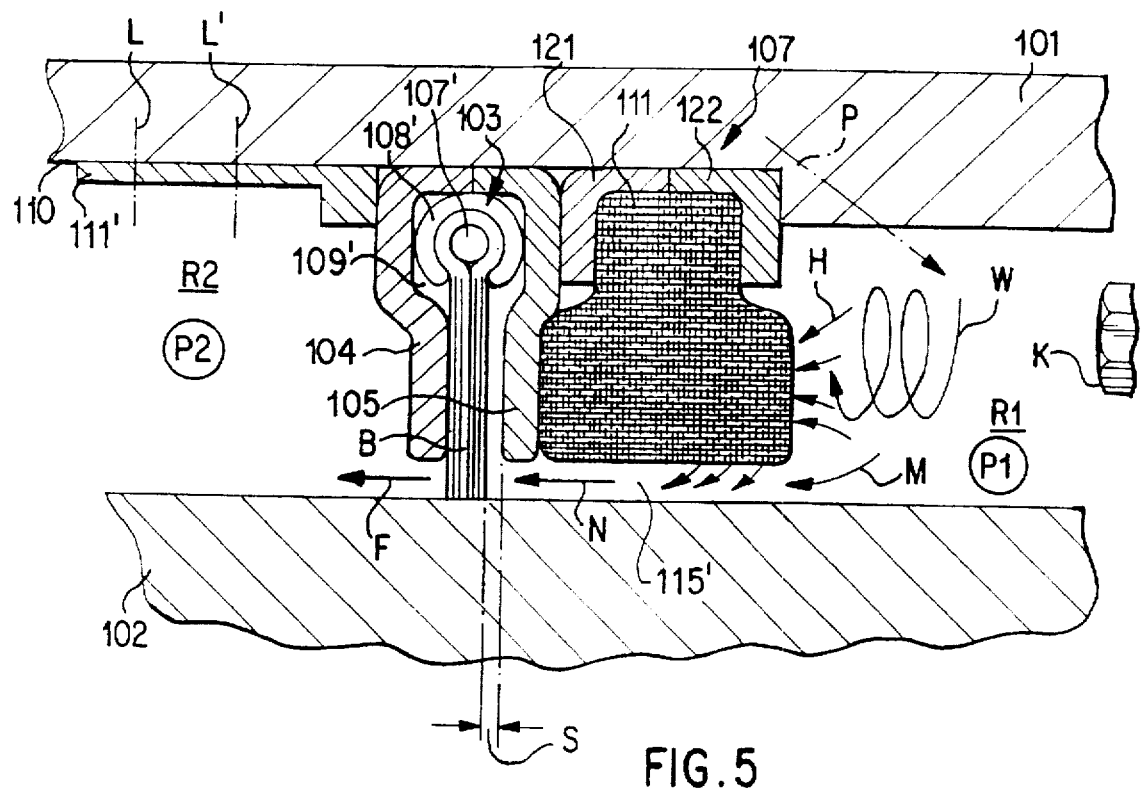
FIG. 5 is an axial sectional view of a brush seal assigned to the respective machine stator and rotor illustrated in a broken-off manner and with a turbulence reducer situated upstream of the brush seal, in the form of a metal sponge.

FIG. 5 illustrates a brush seal for a turbo-engine, particularly for a gas turbine engine. Between an engine casing 101 and the surface of an engine rotor 102 rotatably disposed in a coaxial manner in the casing, the brush seal is to seal off a circumferential gap on spaces R1, R2 which are fluidically acted upon differently by pressure. In this case the fluid pressure P1 in space R1 is higher than the fluid pressure P2 in space R2. The primary leakage flux in the seal is indicated by the arrow F. A holding device 103 for a bristle bundle B is provided on the engine stator 101. From the holding device 103, the bristle bundle B is guided between essentially parallel webs 104, 105 standing perpendicular relative to the rotor surface, in a sealing manner against the rotor surface. On the side facing the space R2 with the lower pressure P2, the bristle bundle B touches the corresponding one interior surface of the web 104. On the other side facing the space R1 with the higher pressure P1, the bristle bundle B forms an axial gap S in the circumferential direction with respect to the interior surface of the web 105.

By means of a holding device 103, the bristle bundle B is arranged on the engine casing 101. The bristle bundle B is gripped by means of a section by a clamping tube 108' which is bent essentially in a U-shape around a core ring 107'. The clamping tube 108' has a circumferential slot for the bristle bundle B. The clamping tube 108 is fixed radially on the inside in an annulus 109' which is open one side and is formed by two casing parts containing the circumferential webs 104, 105. Both casing parts with the webs 104, 105 are clamped into a circumferential groove and are held. The circumferential groove is formed by a stepped widening 110' of the engine casing 101 on a larger inside diameter as well as by the axial end surface of a ring component 111'. The latter is screwed along the lines L, L' to the engine casing 101. This indicated type of fastening of the brush seal on the housing can be used accordingly in the case of all embodiments discussed in the following.

An important feature of the embodiment of the invention of FIGS. 5–12 is the provision of a turbulence reducing device upstream of the brush seal for dissolving a turbulent flow W caused by the engine rotor 102.

Basically, the thrust reducer according to FIG. 5 consists of a ring body 111 which is structured in a flow-permeable manner and which, together with the end of one web 105, with respect to the rotor surface encloses an axial ring duct 115' which is connected with the axial gap S in front of the bristles. The ring body 111 illustrated in FIG. 5 is basically constructed as a metal sponge which has a relatively low porosity. The basic function of the preferred embodiment of the invention of FIG. 5 is as follows.

Pressurized air is fed in the direction of the arrow P in the indicated diagonal position to the annulus R1 in front of the device. Particularly as a result of a formation of a rotational turbulence W resulting from circumferential screwheads K, normally the gap flow according to the arrow N would be swirled to such an extent that no orderly position of the bristles of the bristle bundle B would be possible. According to the invention, from the area of the rotational turbulence W, portions now flow off according to the arrow H laterally in the front into the ring body 111 and then flow according to the direction of the arrow on the interior circumferential surface of the ring body 111 off into the axial ring duct 115'. According to the arrow M, the significant fluid portion flows out of the basically already calm turbulent flow area W in the front axially into the axial ring duct 115'. Inside the axial ring duct 15' a further calming of the sealing fluid flow takes place so that the flow according to arrow N upstream of the bristles of the brush seal is calm. The above-mentioned screwheads K are non-rotatably connected with the engine rotor 102.

Figure 6:
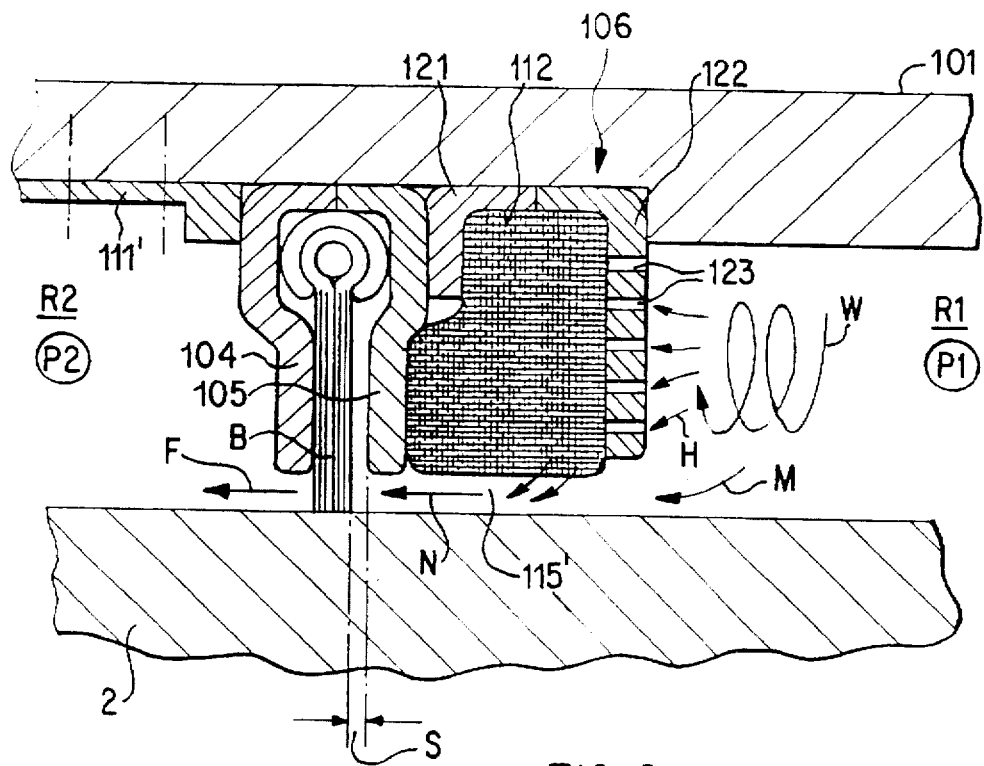
FIG. 6 is an axial sectional view of the brush seal with the corresponding assignment of the engine stator and rotor basically constructed according to FIG. 5, in this case with a further embodiment of a turbulence reducer upstream of the seal, also constructed as a metal sponge with a relatively low porosity and with axial bores in the right shell part.

As FIG. 5, FIG. 6 also shows that the ring body 112 constructed as a metal sponge is surrounded at least partially by two parts 121, 122 of a casing. According to FIG. 6, one part 122 of the casing has axial passage openings 123 along the high-pressure side end surface of this ring body 112. These axial passage openings 123 are locally connected to the flow-permeable inside structure of the porous ring body 112. In addition, the ring body 112 illustrated in FIG. 6, in comparison to that 111 of FIG. 5, has a lower porosity. Also, the basic function described in FIG. 5, with respect to the formation of the rotational turbulence W and its reduction, is also practical for the embodiment according to FIG. 6.

Figure 7:
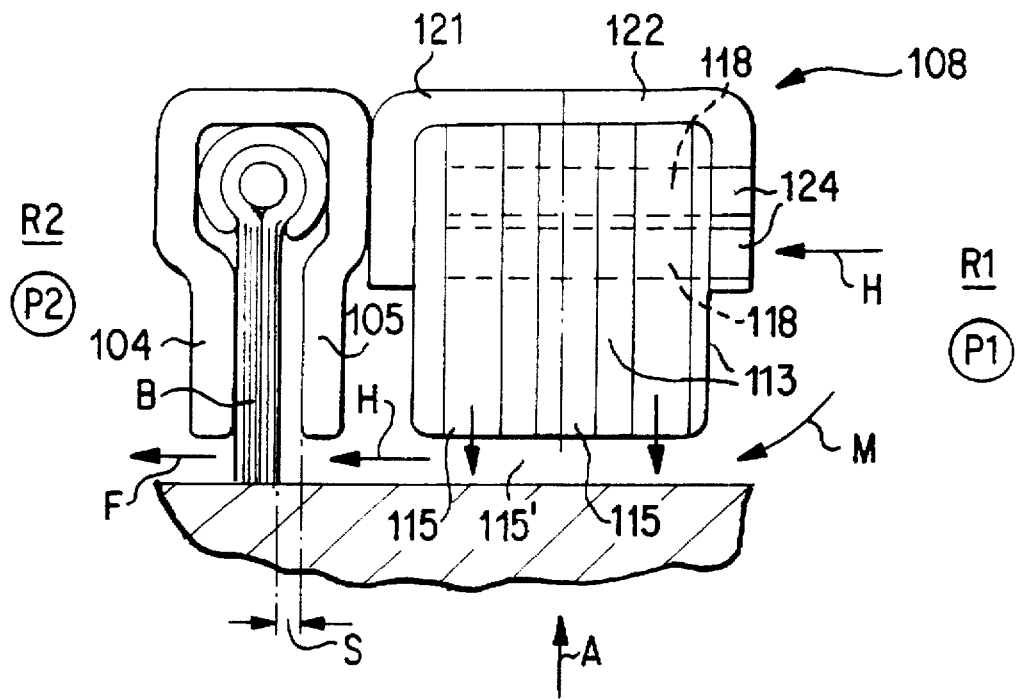
FIG. 7 is an axial sectional view, leaving out the engine stator, of a further variant of a turbulence reducer upstream of the brush seal constructed as a ring body structured in the manner of a honeycomb and provided with radial and axial ducts.
Figure 8:
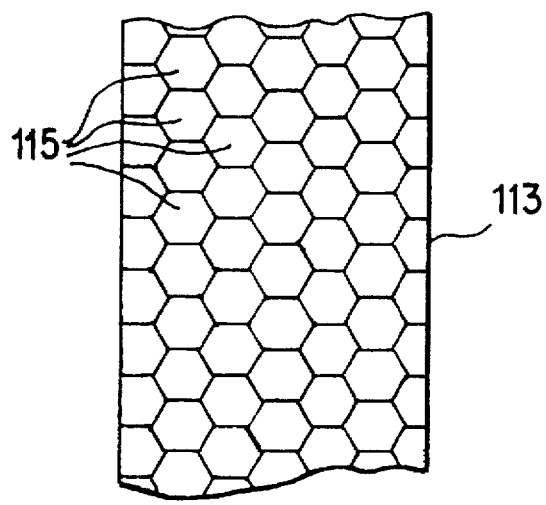
FIG. 8 is a view according to viewing direction A of FIG. 7 in which the rotor is left out.

According to FIG. 7 and 8, the ring body 113 of the turbulence reducing device consists of a duct structure constructed in the manner of a honeycomb, in which case radial ducts 115 have the reference number 115 and possibly provided auxiliary axial ducts have the reference number 118. Therefore, in the example of FIG. 7 and 8, the ring body has axial and radial ducts 118, 115 which are fluidically connected with one another in positions which are bent relative to one another. On one side, the radial ducts 115 lead into the axial ring duct 115' and, on one side, the axial ducts 118 are connected with the space R1 of the higher fluid pressure P1. To this extent, for the purpose of eliminating the damaging rotational turbulence W, the device with the ring body 113 according to FIGS. 7 and 8 is practically identical to the device according to FIGS. 5 and 6.

Figure 9:
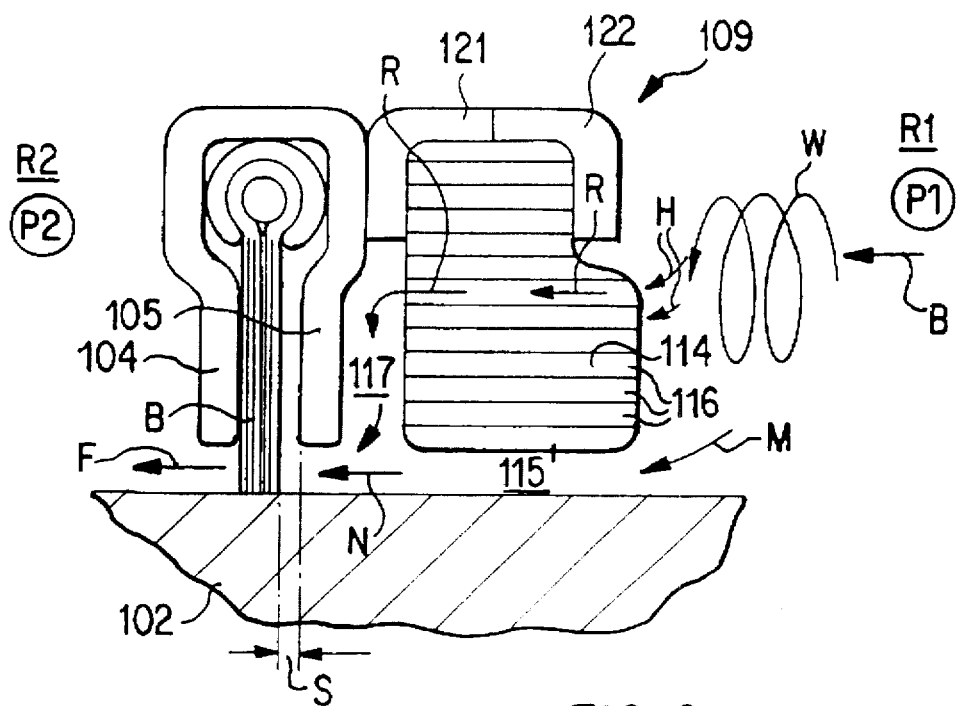
FIG. 9 is an axial sectional view, in which the engine stator is left out, of a further variant of a turbulence reducer upstream of the brush seal constructed as a ring body structured in the manner of a honeycomb, however, in this case with axial flow-through ducts.
Figure 10:
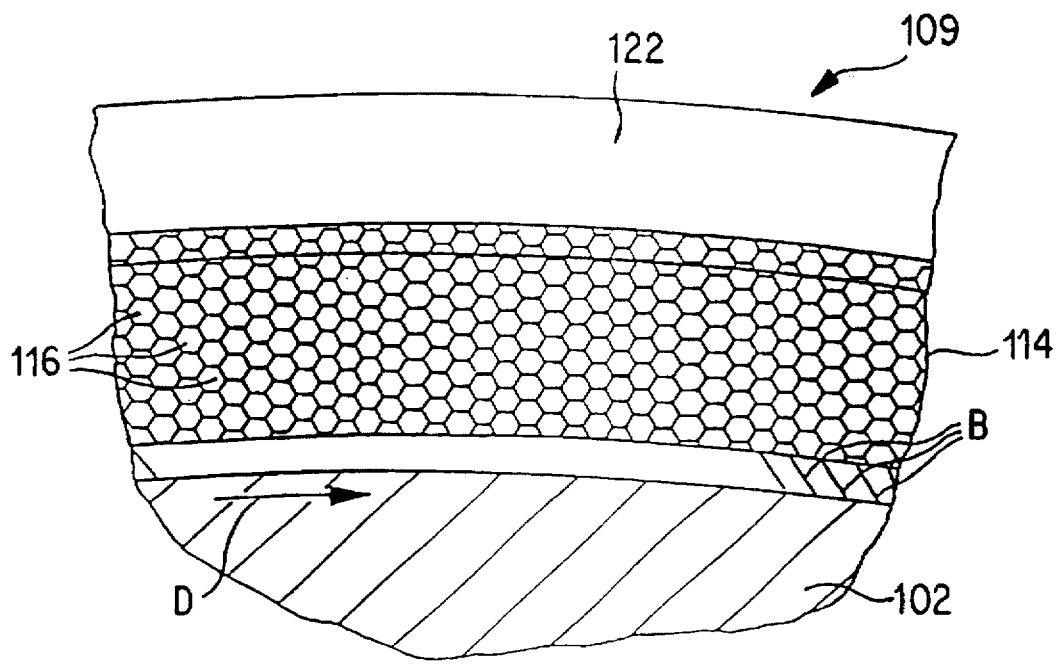
FIG. 10 is a view according to the viewing direction B of FIG. 5, of the setting angle of the bristles which is uniform along the circumference and is diagonal in the rotating direction D of the engine rotor.

In the case of the device 109 according to FIG. 9 and 10, a ring-shaped body 114 structured in the manner of a honeycomb is also provided which, however, in this case, is penetrated only by axial ducts 116 from the right to the left. Portions of the rotational turbulence W therefore flow in FIG. 9 in the axial direction according to arrows R through the axial ducts 116; specifically, the axial ducts 116 end on the low-pressure side of the ring body 114 in a circumferential gap 117. This circumferential gap 117 is constructed between the corresponding one low-pressure side surface of the ring body 114 and the one web 105 arranged upstream of the bristle bundle B. On the side facing the rotor 102, the circumferential gap 117 is connected with the axial ring duct 115' extending opposite the rotor surface.

The honeycomb-type structured duct guidance according to FIGS. 7 to 10 also has the advantage that, by way of the polygonal duct structures, a targeted edge breaking of the turbulent air flow W absorbed by the corresponding devices is achieved.

Figure 11:
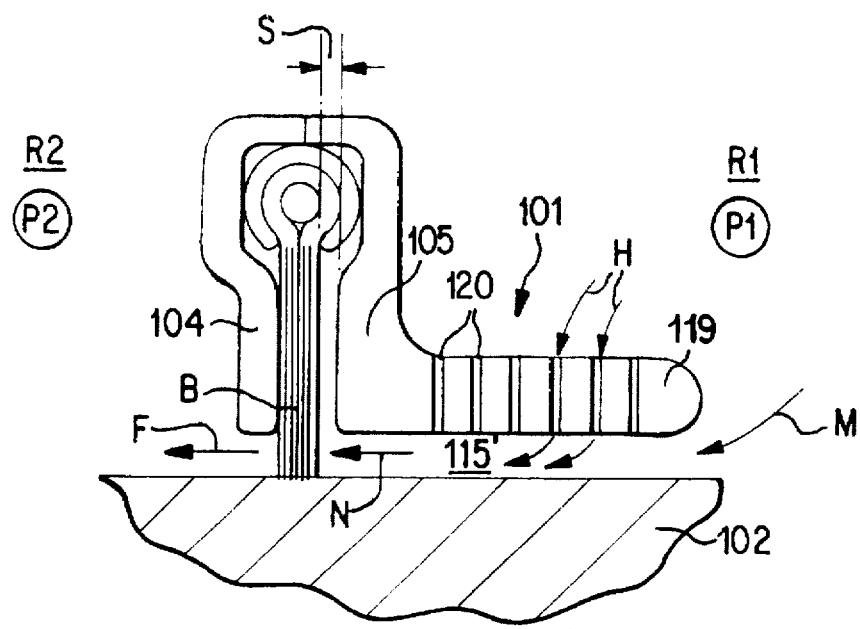
FIG. 11 is an axial sectional view, in which the engine stator is left out, of the brush seal with a further turbulence reducer constructed as an axial ring flange upstream of the seal, on a web and with radial bores in the ring flange which connect the space of the higher pressure with the axial ring duct.

FIG. 11 illustrates a device 110 which is produced in one piece at least together with the one web 105. Therefore, according to FIG. 11, the one web 105 of the brush seal is axially extended upstream in the manner of a ring flange 119. The ring flange 119 is situated at a radial distance from the rotor surface and, in this case, also forms a radial ring duct 115' with respect to the corresponding rotor surface. In this case, the axial ring duct 15' upstream of the bristles of the bristle bundle B is connected with the axial gap S. In addition, the ring flange has radial passage bores 120 distributed along the circumference. Also in this embodiment, the above-mentioned rotational turbulence W is largely eliminated or destroyed in that portions from the rotational turbulent flow off in the direction of the arrow H by way of the radial bores 120 into the axial ring gap 115'.

Figure 12:
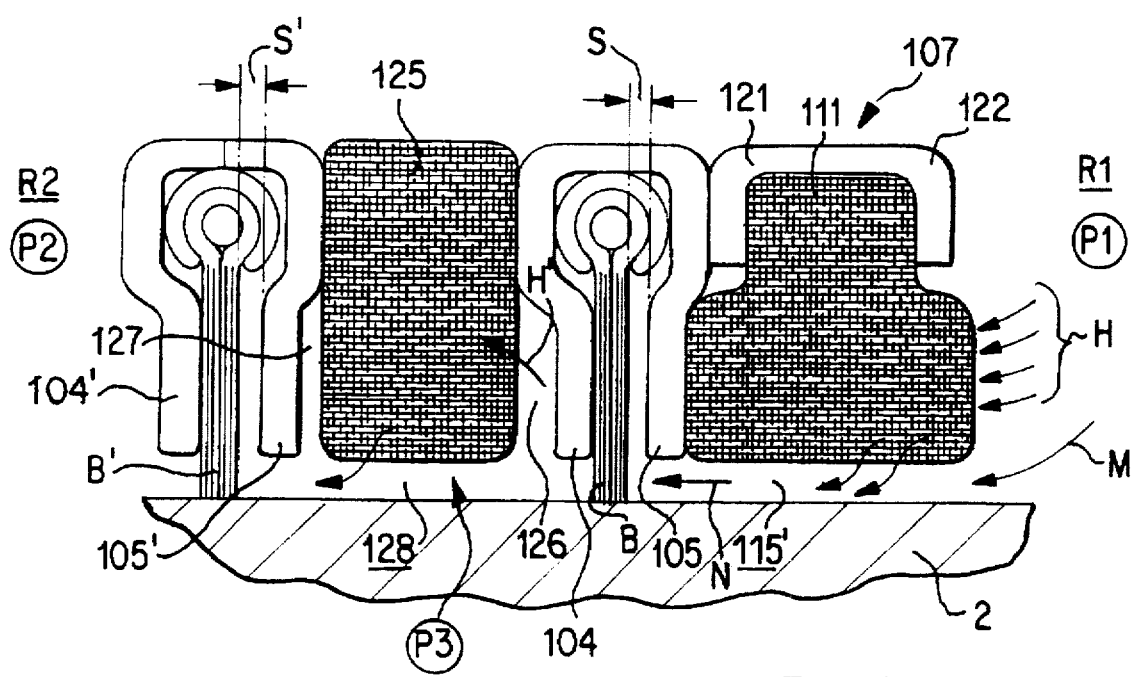
FIG. 12 is an axial sectional view, in which the engine casing is left out, of a multistep pressure seal as a brush seal with an additional metal sponge between two individual brush seals arranged at an axial distance.

FIG. 12 represents a multistep pressure seal with two bristle bundles B, B' held axially at a distance on the engine stator 101. Between two casing parts axially facing one another at a distance and having the webs 104, 105' of the first and the second seal, another ring body 125 is arranged which, in this case, is constructed, for example, has a metal sponge. Between the two axial front faces of the additional metal sponge 125 and the webs 104, 105' for the bristles of the first and the second seal, circumferential gaps 126, 127 are left which lead out into another axial ring duct 128. The additional axial ring duct 128 forms another pressure space axially between the corresponding ends of both bristle bundles B, B'. In addition, according to FIG. 12, the radial gap widths of the axial ducts 15, 28 are identical.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. Brush seal assembly for a turbo engine of the type having an engine rotor and an engine stator, comprising:
   a bristle bundle,
   a bundle holder holding the bundle in sliding sealing contact with one of the engine rotor and engine stator intermediate an upstream high pressure space and a downstream low pressure space, and
   a turbulence reducer disposed upstream of at least some of the bristle bundle bristles, said turbulence reducer including at least one shielding bristle bundle layer of said bristle bundle at an upstream side of said bristle bundle, said at least one shielding bristle bundle layer including bristles with a greater thickness than the thickness of adjacent downstream bristles.

2. Brush seal assembly according to claim 1, wherein said bundle holder is provided on the stator, and wherein ends of the bundle are in sliding sealing contact with the rotor.

3. Brush seal assembly according to claim 2, wherein the bundle holder includes upstream and downstream circumferential webs guiding the bundle with a circumferentially extending axial gap between the bundle and the upstream web during operation of the turbo engine with a rotating engine rotor.

4. Brush seal assembly according to claim 3, wherein the turbulence reducer forms one flank of the axial gap.

5. Brush seal assembly according to claim 3, wherein the turbulence reducer includes bristle bundle layers with a bristle thickness which increases in a direction of both flanks of the axial gap.

6. Brush seal assembly according to claim 3, wherein the turbulence reducer includes a ring body which is open essentially on one side with respect to the fluid in the high pressure space and is structured to be at least partially flow-permeable, which ring body together with an end of the upstream web with respect to the rotor surface, encloses an axial ring duct which is connected in front of the bristles with the axial gap.

7. Brush seal assembly according to claim 6, wherein the ring body is constructed as a metal sponge.

8. Brush seal assembly according to claim 6, wherein the ring body is a honeycomb-type structure.

9. Brush seal assembly according to claim 8, wherein the ring body has radial ducts formed by the honeycomb structure.

10. Brush seal according to claim 8, wherein the ring body is penetrated by axial ducts contained in the honeycomb structure.

11. Brush seal assembly according to claim 10, wherein the ducts lead on one side of the ring body into a circumferential gap which is constructed between the corresponding one ring body side and the upstream web and is connected with the axial ring duct extending opposite the rotor surface.

12. Brush seal assembly according to claim 8, wherein the ring body has axial and radial ducts which are fluidically connected with one another in positions which are bent relative to one another, the radial ducts leading out on one side into the axial ring duct and the axial ducts on one side being connected with the high pressure space.

13. Brush seal assembly according to claim 6, wherein the ring body is surrounded on the outside and along both axial end faces at least partially by a two-part casing and is held on it, one part of the casing, along the high-pressure-side end surface of the ring body having axial passage openings which are locally connected to the flow-permeable interior structure or directly to the one-side ends of the axial ducts.

14. Brush seal assembly according to claim 6, comprising a multistep pressure seal with two bristle bundles held axially at a distance from one another on the engine stator wherein, between two casing parts which axially face one another at a distance and have the respective webs of the first and second seal, an additional ring body in the form of a metal sponge, is arranged.

15. Brush seal assembly according to claim 14, wherein circumferential gaps remain between both axial front faces of the additional metal sponge and webs for the bristles of the first and second seal, which gaps lead out into another axial ring duct which forms another pressure space axially between the corresponding ends of both bristle bundles.

16. Brush seal assembly according to claim 3, wherein the turbulence reducer includes a further shielding device produced in one piece at least together with the upstream web.

17. Brush seal assembly according to claim 16, wherein the upstream web is axially extended upstream in the manner of a ring flange which forms an axial ring duct at a radial distance from the rotor surface, which ring duct is connected upstream of the bristles with the axial gap and has radial passage bores distributed along the circumference.

18. Bristle seal assembly according to claim 3, wherein said bristle bundle includes at least one shielding bristle bundle layer at a downstream side of said bristle bundle.

19. Bristle seal assembly according to claim 18, wherein said bundle holder is provided on the stator, and wherein ends of the bundle are in sliding sealing contact with the rotor.

20. Bristle seal assembly according to claim 19, wherein all of said bristle bundle bristles are clamped together in said bundle holder.

21. Brush seal assembly according to claim 1, wherein said turbulence reducer includes a further shielding device facing the low pressure space.

22. Brush seal assembly according to claim 1, wherein said turbulence reducer includes a wire netting contained on the bristle bundle.

23. Bristle seal assembly according to claim 22, wherein the wire netting is arranged on the bundle holder together with the bristle bundle and is clamped between a section of the bristle bundle which is essentially bent in a U-shape around a core ring and a clamping tube equipped with a circumferential slot, which clamping tube is disposed radially inside an annulus open on one side which is formed by two casing parts containing circumferential webs.

24. Bristle seal assembly according to claim 1, wherein the at least one shielding bristle layer is arranged on the bundle holder clamped between a section of the bristle bundle which is essentially bent in a U-shape around a core ring and a clamping tube equipped with a circumferential slot, which clamping tube is disposed radially inside an annulus open on one side which is formed by two casing parts containing circumferential webs.

25. Bristle seal assembly according to claim 1, wherein said bristle bundle includes at least one shielding bristle bundle layer at a downstream side of said bristle bundle.

* * * * *